United States Patent [19]

van Beijnen et al.

[11] Patent Number: 5,238,755

[45] Date of Patent: Aug. 24, 1993

[54] FUEL CELL CONTAINING AN ANODE PRODUCED BY POWDER METALLURGY

[75] Inventors: Christianus A. M. van Beijnen, Oudorp; Sytze B. van der Molen, Schagen, both of Netherlands

[73] Assignee: Stichting Energieonderzoek Centrum Nederland, Petten, Netherlands

[21] Appl. No.: 656,281

[22] Filed: Feb. 14, 1991

[30] Foreign Application Priority Data

Feb. 20, 1990 [NL] Netherlands .......................... 9000405

[51] Int. Cl.$^5$ .............................................. H01M 8/14
[52] U.S. Cl. .......................................... 429/40; 429/45
[58] Field of Search ................................... 429/40, 45

[56] References Cited

U.S. PATENT DOCUMENTS

| | | |
|---|---|---|
| 4,247,604 | 1/1981 | Marianowski . |
| 4,943,496 | 7/1990 | Okada . |
| 4,997,729 | 3/1991 | Hatoh . |

FOREIGN PATENT DOCUMENTS

| | | |
|---|---|---|
| 0259226 | 3/1988 | European Pat. Off. . |
| 1812144 | 8/1969 | Fed. Rep. of Germany . |
| 2945565 | 5/1980 | Fed. Rep. of Germany . |
| 2411483 | 7/1979 | France . |
| 61-273861 | 4/1987 | Japan . |
| 64-17805 | 1/1989 | Japan . |
| 2006271 | 5/1979 | United Kingdom . |

OTHER PUBLICATIONS

Japanese 73036614-B Abstract only.

*Primary Examiner*—Olik Chaudhuri
*Assistant Examiner*—M. Nuzzolillo
*Attorney, Agent, or Firm*—Young & Thompson

[57] ABSTRACT

The invention provides a powdered starting material for a nickel-based alloy for manufacturing a porous anode of a fuel cell containing 0.5 to 10% by weight of aluminum, titanium and/or zirconium. The powder is manufactured using a mixture of carbonyl nickel powder and a powder of an intermetallic aluminum, titanium and/or zirconium compound having a particle size of 1 to 10 microns. The powder is produced by mixing the carbonyl nickel powder with an amount of an intermetallic compound such that 0.5 to 10% by weight of the desired element or elements is present in the anode material, the intermetallic compound having a particle size of 1 to 10 mm. An anode for a fuel cell can be produced from the powder by applying the powder to a substrate and sintering it at 900° to 1100° C.

2 Claims, No Drawings

FUEL CELL CONTAINING AN ANODE PRODUCED BY POWDER METALLURGY

The invention relates to a fuel cell containing an audio produced from a powdered starting material for a nickel-based alloy which contains 0.5 to 10% by weight of aluminum, titanium and/or zirconium.

Such an alloy is known from European Patent Application 0,259,226, which describes a powdered nickel-based alloy in which the particles size is 3 to 30 micrometers. Said powder is preferably formed by water atomization, the water injection pressure being 400 kg/cm$^2$ and 0.02 to 2 m$^3$ of water being used per kg of powder.

Until a short time ago, the most generally used method for manufacturing an anode for molten carbonate fuel cells was to mix carbonyl-nickel powder with 1 to 10% by weight of chromium powder. Tapes of said powder mixture were cast on a flat base and said tapes were sintered. Another common method is to cast and sinter tapes from 100% carbonyl-nickel powder and then immerse them in an aqueous solution of $Cr(NO_3)_2$, followed by drying and heat treatment.

In both methods it is desirable that use is made of carbonyl-nickel powder which;
a) gives a very attractive structure in the anode material with the desired pore size because the nickel powder has a special chain structure of primary particles having a size of approximately 3 micrometers,
b) has a very attractive price.

disadvantage is, however, that the anode material containing 1–10% by weight of chromium exhibits too much creep during operation in the cell at fairly high temperature (650°–700° C.), as a result of which the material undergoes much shrinkage and, in particular, the thickness decreases considerably under the influence of a vertically applied loading of 2–4 kg/cm$^2$. (Such a loading usually occurs as a result of the structure of the cells.) This results in decreasing cell performances during a prolonged period of service.

It is known that the creep properties of anode material composed of nickel containing 0.5–10% by weight of aluminum are appreciably better in molten carbonate fuel cells (1).

A possible method of manufacturing these anodes would be to mix nickel powder with 0.5–10% by weight of aluminum powder of approximately the same particle fineness as the nickel powder and to use this mixture in casting tapes and sintering. However, the melting point of aluminum is 660° C., whereas the sintering is carried out at 900° to 1100° C. This results in premature melting of the Al with exothermic reactions between aluminum and nickel as the consequence. Said reactions cannot practically be controlled and several aluminum nickel compounds will be formed, that can completely destroy the structure present by the formation of relatively large agglomerates with an undesired pore structure. In addition, Al having the desired fine particle size of 3 micrometers or less is so susceptible to O$_2$ absorption that this powder and the mixtures thereof can be used only under O$_2$-free conditions, and this would have a considerable cost-increasing effect.

A second possible way of manufacturing anodes containing 0.5–10% by weight of Al is by making use of powders having the desired composition which are produced by atomizing. This may be by water atomizing (1) or by gas atomizing.

Disadvantages of this method are:
a) The powders obtained by atomizing are expensive, especially if fine powders having a particle size of approximately 3 microns are necessary.
b) The particle shape of these powders approximates more to a round shape, whereas carbonyl nickel has more of a chain structure. The round particles are considerably disadvantageous for the desired anode structure.

A starting material of the type described in the preamble has now been found which is characterized in that it is manufactured using a mixture of a carbonyl-nickel powder and a powder of an intermetallic compound of Nickel with an aluminum, titanium and/or zirconium compound having a particle size of 1–10 micrometers. In this case intermetallic compounds having a sufficiently high melting point are used. The percentage by weight of said intermetallic compounds which are used is so chosen that 0.5 to 10% by weight of the desired element or elements is present in the anode material.

The invention therefore also provides fuel cell having an anode produced by a method which is characterized in that the carbonyl-nickel powder is mixed with an amount of the intermetallic compound which is such that 0.5 to 10% by weight of the desired element or elements is present in the anode material, the intermetallic compound having a particle size of 1 to 10 micrometers.

By applying a powder according to the invention to a substrate and sintering in a suitable manner at a temperature of 900° to 1100° C., an anode can be manufactured for fuel cells.

The anode materials obtained can be used in a manner known per se in fuel cells and are very effective in them.

In said method and in said powdered starting material suitable intermetallic compounds are NiAl, Ni$_2$Al$_3$, NiAl$_3$, NiTi, NiTi$_2$, NiZr and NiZr$_2$.

Intermetallic compounds have a brittle nature and can therefore readily and cheaply be ground to form small particle sizes.

In order, therefore, to manufacture anodes containing 0.5 to 10% by weight of Al in the nickel, the intermetallic compound NiAl, for example, is ground to a particle size of less than 10 micrometres, average particle size approximately 3 micrometres. Enough fine NiAl powder is now mixed with carbonyl-nickel powder that the desired percentage by weight of Al is achieved in the mixture. In order, for example, to achieve 5% by weight of Al in the mixture, 15.88% by weight of NiAl is added to the carbonyl nickel.

The invention offers the following advantages:
a) The attractive carbonyl-nickel powder can be used,
b) the intermetallic compound added can be added in virtually any desired particle size,
c) because the aluminum is now bound to a second element, it is less inclined to absorb oxygen,
d) at 1638° C., the melting point of, for example, nickel-aluminum is far above the temperature at which the tapes are sintered (approximately 900° to 1100° C.), as a result of which only well controlled solid state reactions occur during the sintering of the anode. As a result of this, an attractive anode structure is obtained. Intermetallic compounds with their melting points are:

| NiAl | Ni₂Al₃ | NiAl₃ | NiTi | NiTi₂ | NiZr | NiZr₂ |
|---|---|---|---|---|---|---|
| 1638° C. | 1550° C. | 1100° C. | 1310° C. | 1000° C. | 1260° C. | 1120° C. | e) as the aluminum diffuses out of the NiAl into the carbonyl nickel during the sintering process, the melting point of the NiAl will not drop below 1385° C. This is therefore still well above the sintering temperature. The same applies, of course, to the other intermetallic compounds mentioned.

EXAMPLE I

A powdered starting material was prepared by mixing carbonyl-nickel powder having an average particle size of 2.9 microns with an amount of NiAl such that the mixture contained 15.88% by weight of NiAl. (Average particle size of the NiAl 5.9 micrometers). This mixture was used to manufacture anode material sintered on in the form of approximately 1 mm thick sheet material with the aid of the so-called "tape casting" procedure.

Some of said sheet material measuring 40×100mm was sintered at 1000° C. under a reducing atmosphere (75% $N_2$+25% $H_2$) for thirty minutes on a supporting base of aluminum oxide. After the sintering it was determined with a microprobe that 90% of the aluminum present had diffused into the nickel. This was further confirmed by an X-ray diffraction test.

This small sintered plate was removed from the supporting base and a small plate having a diameter of 19.4 mm taken therefrom was used as anode material in a molten carbonate fuel cell. During the test period of 5,000 hours with a loading of 150 milliamperes per $cm^2$, the cell potential dropped from 925 millivolts to 920 millivolts, a drop therefore of 5 millivolts.

Under comparable conditions, the cell potential certainly drops 25 millivolts if an Ni-10% by weight chromium anode is used. (Known from experience).

For a target fuel cell service life of 40,000 hours and an initial potential of 925 millivolts, this means, in the final phase, a potential under a load of 885 millivolts for the NiAl anode and of 725 millivolts for the NiCr anode. An attractive difference therefore exists to the advantage of the NiAl anode.

We claim:

1. A fuel cell containing an anode produced by sintering at 900°-1100° C. on a substrate a powdered starting material for a nickel-based alloy for manufacturing said anode, which contains 0.5 to 10% by weight of aluminum, the anode having been produced by admixing nickel carbonyl powder and a powder of an intermetallic nickel compound with aluminum selected from the group consisting of NiAl, Ni₂Al₃ and NiAl₃ and having a particle size of 1-10 micrometers.

2. A fuel cell according to claim 1, wherein said intermetallic nickel compound is NiAl.

* * * * *